Feb. 1, 1927.
C. A. B. HALVORSON, JR
1,616,042
ILLUMINATING DEVICE
Filed April 7, 1920   3 Sheets-Sheet 1
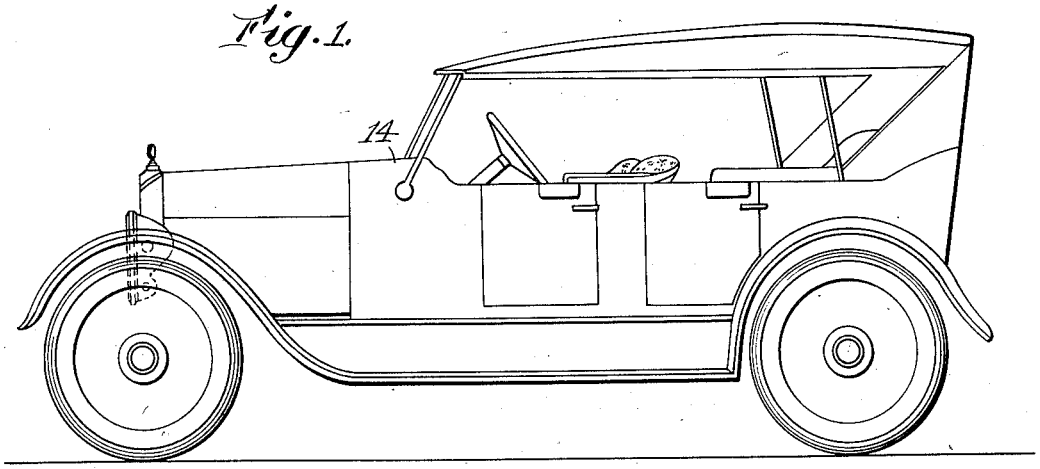
Fig. 1.
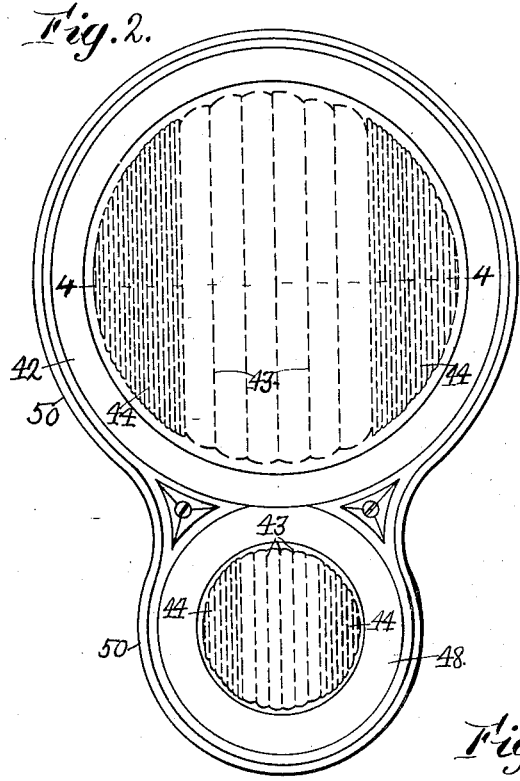
Fig. 2.
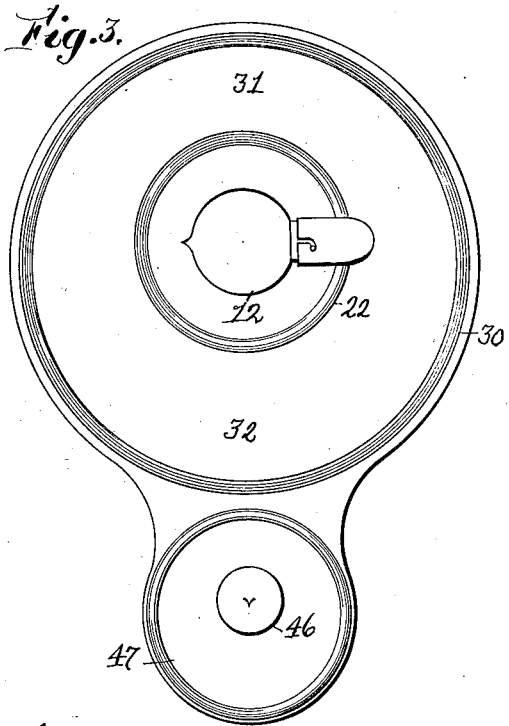
Fig. 3.
Fig. 4.
Inventor
Cromwell A. B. Halvorson Jr.
by Jas. H. Churchill Atty.

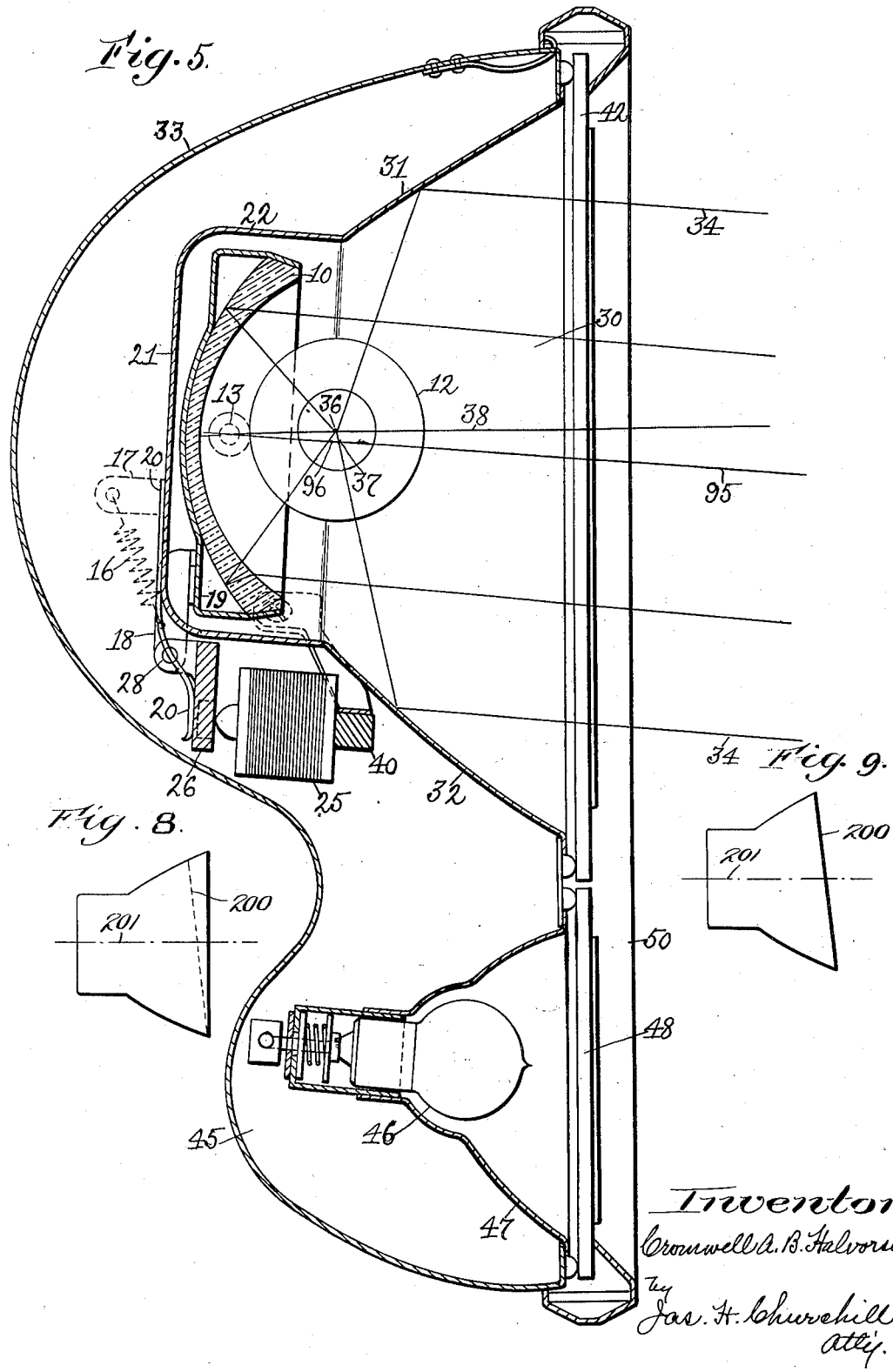

Feb. 1, 1927.
C. A. B. HALVORSON, JR
1,616,042
ILLUMINATING DEVICE
Filed April 7, 1920      3 Sheets-Sheet 3
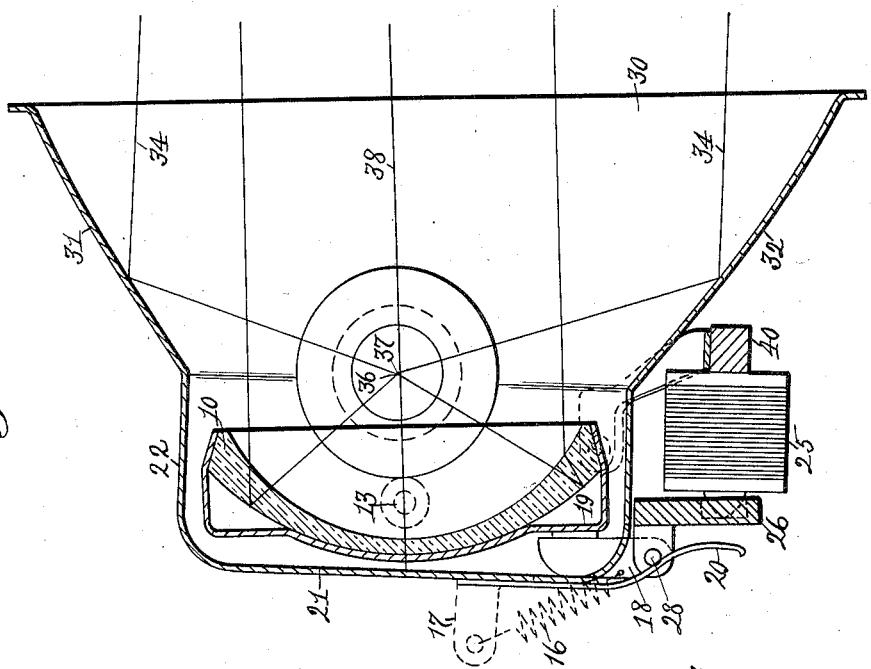
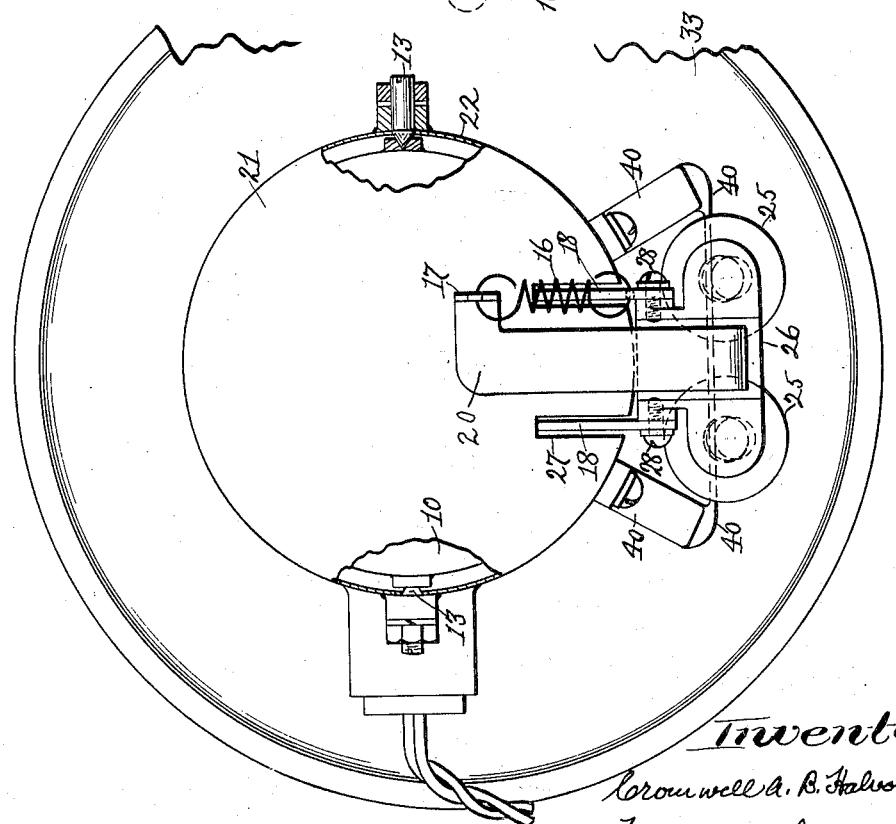

Patented Feb. 1, 1927.

1,616,042

UNITED STATES PATENT OFFICE.

CROMWELL A. B. HALVORSON, JR., OF LYNN, MASSACHUSETTS, ASSIGNOR OF ONE-HALF TO CHILDE HAROLD WILLS, OF DETROIT, MICHIGAN.

ILLUMINATING DEVICE.

Application filed April 7, 1920. Serial No. 371,929.

This invention relates to an illuminating device and is herein shown as embodied in a headlight for motor vehicles and particularly pleasure vehicles.

One object of the present invention is to provide an illuminating device or headlight with which a beam of light is initially projected into and maintained in a non-glaring position independently of the operator, and which beam at the will of the operator is capable of being moved into a glaring position to obtain distant lighting of the roadway. To this end the illuminating device comprising essentially a reflector, a source of light and a light transmitting member, is provided with automatically operating means for positioning the beam of light projected by the reflector into a non-glaring position under normal conditions of use and to maintain said beam in said non-glaring position independently of the operator, and is further provided with means for moving said beam from its normal non-glaring position into a distant lighting position with materially reduced or permissible glare at the will of the operator.

Another object of the invention is to obtain constant illumination of the roadway without glare for a substantial distance in front of the vehicle by a second beam of light, preferably of less volume than the distant lighting beam, and with which the latter beam cooperates under normal conditions of use to increase the illumination of the roadway under normal conditions. To this end, the illuminating device is provided with a reflector having a fixed or stationary position, as will be described.

A further object of the invention is to obtain the illumination of the roadway without glare under normal conditions, with a headlight which is arranged on the vehicle in the same relation thereto as now commonly employed on automobiles, that is, with the front face of the headlight casing substantially at right angles to the roadway. To this end the reflector with which constant illumination of the roadway with a non-glaring light is obtained, is made on the bias as will be described.

The invention further has for its object to effect the above recited objects with a simple, inexpensive and efficient apparatus, in which the parts are constructed and arranged to form a unit capable of being attached to and removed as one piece from the headlight casing or other support.

A further object of the invention is to obtain an unequal lateral diffusion or spread of the two beams of light so as to obtain excellent illumination of the roadway in front of and laterally of the vehicle for driving purposes without glare under normal conditions of use, without materially diminishing the intensity of the beam employed for distant lighting so as to seriously impair its effectiveness for distant lighting. To this end, a light transmitting member is provided which is constructed and arranged with relation to the reflectors to effect lesser lateral diffusion of the movable beam of light than of the stationary beam.

These and other features of this invention will be pointed out in the claims at the end of this specification.

Fig. 1 is a side elevation of a motor vehicle provided with headlights embodying this invention.

Fig. 2, a front elevation of the headlight shown in Fig. 1.

Fig. 3, a front elevation of the headlight with the glass or lens removed.

Fig. 4, a sectional detail of the glass shown in Fig. 2, the section being taken on the line 4—4.

Fig. 5, a vertical section on an enlarged scale of the headlight shown in Figs. 1 and 2 showing the parts in their normal position.

Fig. 6, a vertical section of the headlight showing the movable reflector in position to obtain distant lighting.

Fig. 7, a rear elevation on an enlarged scale of the headlight with the parts in their normal position.

Figs. 8 and 9, details to illustrate the bias construction of the front reflector.

In Figs. 1 to 7 is illustrated a preferred construction of illuminating device in the form of a headlight for automobiles, with which the desirable results above mentioned are obtained. The construction comprises a movable reflector 10, preferably in the form of a Mangin mirror, of known construction, which is located behind a light source, herein shown as an electric incandescent light 12. The movable reflector 10 is pivotally mounted substantially at its horizontal center as at 13 and cooperates with the light 12 to give a beam of light of relatively high intensity, which is used for illuminating an area of the roadway in front of the motor vehicle 14 in the vicinity thereof without glare and is also used for illuminating with materially reduced or permissible glare the roadway beyond the said area, which latter illumination will be hereinafter referred to as the distant lighting.

In accordance with this invention, provision is made for positioning the reflector 10, so that under normal conditions of use its beam of light is projected into and maintained in a non-glare position independently of the operator, so as to illuminate the roadway without glare to the driver of a motor vehicle approaching in the opposite direction. This result is accomplished as herein shown by a spring 16 having one end connected with a stationary arm 17 and its other end to an arm 18 affixed to the frame 19 of the movable reflector 10.

The movement of the reflector 10 under the influence of the spring 16 is limited by a stop, herein shown as a stationary arm 20 attached to the rear wall or head 21 of a casing or housing 22 in which the reflector 10 is located and is supported by the center or pivot screws 13, which are extended through the side walls of said casing, see Fig. 7.

It will thus be seen, that under normal conditions of use, the beam of light projected by the reflector 10 is inclined downwardly toward the roadway in front of the motor vehicle 14 and in the vicinity thereof and is maintained in this position entirely independent of the operator of the motor vehicle, and illuminates an area of the roadway to provide a driving light without glare which extends in front of the vehicle for a substantial distance. When it is desired to illuminate the roadway a material distance ahead of the vehicle, provision is made whereby the operator at his will can turn the reflector 10 so as to project the beam of light onto an area of the roadway materially in advance of the area illuminated by said beam under normal conditions. To this end electromechanical means are employed, comprising as herein shown an electromagnet 25, its armature 26 and the arm 18 which is extended through a slot 27 in the head 21 of the housing or casing 22 and is pivotally connected at 28 to the armature 26, see Fig. 5. The armature 26 is normally held by the spring 16 against a back stop, which is herein shown as the arm 20 attached to the casing 22. The pivot screws 13 for the reflector 10 are adjustable to permit the reflector to be assembled within the casing and to be removed therefrom.

The casing 22 is preferably integral with a parabolic reflector 30, which extends in front of the focal plane and is employed to give a beam of light for illuminating the roadway immediately in front of the vehicle and laterally thereof for driving purposes under normal conditions of use. Provision is made for illuminating the roadway with the reflector 30 without glare, and yet enable the headlight as a whole to be placed on the vehicle in a vertical position with relation to the roadway, as are the headlights on motor vehicles now in use. To this end, the parabolic reflector 30, which may be designated the front reflector, is made on the bias, that is, its upper part or half 31 is made shorter than its lower part or half 32, so that, the front reflector 30 may be positioned with relation to its support, which in the present instance is a casing 33, so that the front faces of the reflector 30 and casing 33 are substantially at right angles to the roadway. By means of this construction of the front reflector 30, the headlight can be secured to the motor vehicle 14 in the desired position to properly dress up the vehicle, as represented in Fig. 1, but in which position a parabolic reflector of ordinary construction and such as now employed would project a beam of light with glare, whereas with the bias construction of front reflector 30, the dressy effect on the vehicle is obtained and at the same time a non-glaring beam is projected down upon the roadway in front of the vehicle, as indicated by the lines 34, Fig. 5.

The bias construction of the front reflector may be obtained by taking a parabolic reflector of ordinary construction indicated in Fig. 8, and cutting off a triangular section of the front reflector on the dotted line 200, whereupon the new front face of the reflector is inclined or abnormal to a horizontal plane through the reflector indicated by the line 201 in Figs. 8 and 9.

The front reflector thus made and indicated in Fig. 9 is arranged in the casing 33, so that the front face of the reflector is substantially normal to a horizontal plane through the casing 33, which is arranged on the vehicle so that its front face is substantially normal to the roadway as above described.

The beam of light projected downwardly upon the roadway by the front reflector 30 is a stationary non-glaring beam, and is designed to illuminate without glare a substantially wide area of the roadway in front of the vehicle under all conditions of use, so that the vehicle is provided with a permanent or constant non-glaring beam for driving purposes. This beam of light is reenforced under normal conditions of use and independently of the operator, by the beam of light projected downward upon the roadway by the rear reflector 10, which latter beam illuminates without glare the roadway, so that under normal driving conditions a wide area of the roadway in front of the vehicle is illuminated without glare for a distance sufficient to ensure driving with comparative safety.

The beam projected by the reflector 10 is preferably of greater intensity than the permanent non-glaring beam and is capable of being moved at the will of the operator, so as to illuminate with materially reduced or permissible glare an area of the roadway materially beyond the area which is illuminated by said beam under normal conditions of use. This is especially desirable when traveling at high speed over straight highways substantially free from cross roads.

Provision is further made for avoiding the necessity of adjusting the lamp 12 to meet the requirements of use and thereby obtain maximum illuminating effects under conditions of use independently of the operator. To this end, the electric lamp 12 is arranged laterally with relation to the axis of the front reflector 30 and extends into the latter in a substantially horizontal plane, and the rear reflector 10 is pivoted at the rear of the electric lamp and at such a distance therefrom, as to bring the focus of the reflector 10 substantially in a vertical plane through the axis of the filament of the lamp and substantially coincident with the latter, when the rear reflector is in its abnormal position, see Fig. 6, to obtain distant lighting, and so as to bring the focus of the rear reflector below the axis of the filament when the rear reflector is in its normal position, see Fig. 5, to obtain substantial road illumination without glare. The axis of the filament is represented by the dot 36 in Figs. 5 and 6, and the focus of the reflector in Fig. 5 by the dot 37.

By reference to Figs. 5 and 6, it will be seen that when the rear reflector 10 is in its normal position shown in Fig. 5 the focus of the reflector 10 represented by the dot 37 is slightly below a horizontal plane 38 through the axis of illumination, to wit, the filament of the lamp 12, and that when the reflector 10 is turned into the position shown in Fig. 6 to elevate the beam of light for distant lighting, the focus 37 is elevated slightly and is substantially coincident with the axis of illumination. By this arrangement, it will be seen that it becomes unnecessary to adjust the focus of the lamp to obtain the desired or proper illuminating effects under all conditions of use. It will also be seen by reference to Fig. 6, that when the distant-lighting beam is at its maximum elevation, the upper or top rays thereof are substantially parallel with the horizontal axis of the headlight and also with the roadway, therefore intense glare is thereby avoided, and what glare may be produced by the distant lighting beam in this condition or position is negligible and unobjectionable to the authorities and to the users of the highways. Such glare is sometimes called permissible glare.

The electromagnet 25 for moving the rear reflector 10 into position for distant lighting, is located under the front reflector 30 in front of a plane through the pivots 13 for the rear reflector 10 and is carried by a frame 40, see Fig. 7, which is fastened to the housing or casing 22, which construction enables the front reflector 30, rear reflector 10, casing or housing 22 for the latter, the operating mechanism for the rear reflector and the electric lamp 12 to be assembled together and form a compact unitary structure, capable of being handled as one piece, and further when provided with a glass or light transmitting member 42 is capable of being suitably supported and used as the headlight itself, or of being used with the casings of headlights now commonly used on motor vehicles, by removing the lamp bulb from the latter and inserting therein the unit structure herein shown.

While the unit structure herein shown may have cooperating with it a plain glass, or one provided with vertically arranged prisms, it is preferred to use a light transmitting member having provision for effecting a substantially great lateral diffusion of rays of the permanent or fixed beam projected by the front reflector 30, and for effecting a lesser lateral diffusion of rays of the movable beam projected by the rear reflector 10, so that, the gutters may be properly illuminated by the rays of the fixed beam, and so that, rays of the movable beam may be merged with the rays of the fixed beam to obtain under normal conditions of use a combined beam which is continuous transversely and with which a substantially uniform unbroken illumination of the roadway in front of and laterally of the vehicle is obtained, without materially diminishing the effectiveness of the movable beam for distant lighting.

In Figs. 2 and 4 is represented a light transmitting member or lens 42 of this character, which is provided with a central portion having prisms or devices 43 substantially widely separated from one another for effecting a substantially slight or limited lateral diffusion of the movable beam of light, and which is provided with other devices 44 which are arranged on opposite sides of the said central portion and in close proximity with one another for effecting a much greater lateral diffusion of the fixed beam.

When the unit structure herein shown is to be used on new motor vehicles, it is preferred to provide it with a new casing 33 as herein shown, which may and preferably will have a chamber 45 for an auxiliary or dimmer light 46 provided with a reflector 47, and the lens 48 for the dimmer lamp may also be provided with the diffusing devices 43, for dressy purpose and to spread the light and diminish its intensity.

In operating a motor vehicle equipped with headlights embodying this invention and of the construction shown in Figs. 1 to 7, it will be seen that when the operator closes the usual lighting switch, (not shown), the roadway in front of the vehicle and laterally thereof is illuminated with a non-glaring light of substantial intensity, by the mere act of closing the switch, and under this condition, which has been referred to above as the normal conditions of use, the electromagnet 25 is deenergized, and current for energizing said magnet is not being consumed. Furthermore it will be noticed that the non-glare condition of the headlight is maintained independently of the operator as long as the vehicle is traveling under normal conditions, as for instance in cities and towns or on highways crowded with motor vehicles, and while the vehicle is traveling under normal conditions, both hands and feet of the operator are free to be used in case of an emergency.

When, however, the conditions of travel are such that the vehicle can be speeded up with comparative safety, which condition may be termed abnormal conditions of use, the operator can then close the circuit of the magnet 25, which attracts its armature 26 and effects movement of the reflector 10 from its normal or tilted position, shown in Fig. 5, into its abnormal or vertical position, shown in Fig. 6, to move the beam projected by it from its non-glaring or driving position into its permissible glaring or distant lighting position in which the upper rays of the said beam are substantially parallel with the roadway as indicated in Fig. 6. When the armature 26 is attracted, energy is stored up in the spring 16 so that when the current is cut off from the magnet 25 the spring 16 automatically operates to instantly return the reflector 10 into its normal position, shown in Fig. 5, and the distant lighting beam is moved from its permissible glaring into its non-glaring or normal driving position indicated by the downwardly inclined lines in Fig. 5. The circuit of the magnet 25 may be closed in any suitable manner, as for instance by a foot operated switch, not shown, the operation of which is well understood and I have not deemed it necessary to illustrate the same herein.

In the present instance, the lenses 42, 48 are separate from the reflectors 30, 47, and carried by a suitable frame 50, which may be attached to the casing 33 in the usual manner now commonly employed with the ordinary headlights of motor vehicles.

In the headlight shown in Figs. 1 to 7, the movement of the beam of light for distant lighting is effected by moving the reflector 10, but it is not desired to limit the invention in this respect.

The axis about which the front reflector 30 is described is represented by the line 95 and the focus of this reflector is represented by the dot 96, which it will be noticed is behind and below the axis 36 of illumination, so as to better concentrate the beam from the reflector 30.

The reflector 47 of the dimmer light is also made on the bias so that the beam of light projected by it is inclined downward under all conditions of use, which is a highly desirable feature in that the complete headlight under normal conditions of use is without glare both when the main light and the dimmer light are in service and when the dimmer light alone is used which is of advantage, as in case of accident to the main lighting unit, the operator can proceed with a non-glaring light from the dimmer unit and satisfy the laws and regulations, which require motor vehicles to be equipped with non-glaring headlights while in motion in cities and like places.

I claim:

1. In an illuminating device, in combination, a two-part common focus reflector, comprising a part extending in front of the focal plane with its axis inclined downward, and a part in rear of the focal plane, and means for tilting the rear part to a substantially horizontal axial position.

2. In an illuminating device, in combination, a light source, a beam-projecting device co-operating with said light source and normally arranged to project a beam of light downward to avoid glare, a second beam-projecting device co-operating with said light source to normally project a second beam of light into a non-glaring position wherein it co-operates with the first-mentioned beam to produce a combined non-glaring beam of maximum lighting effect, means for effecting movement of one of said beams of light into a glaring position while the other of said beams is retained in a non-glaring position, means rendered effective by movement of said beam moving means to return the movable beam from its glaring position into its non-glaring position, and means for connecting said parts together to form a unit capable of being inserted into and withdrawn from a casing as one piece.

3. In an illuminating device, in combination, a source of light, a front reflector co-operating therewith to project a beam of light, a rear reflector co-operating with said source of light, means connected with one of said reflectors to be moved therewith for supporting the other of said reflectors, means connected with the supporting reflector for moving the beam of light projected by the other of said reflectors into a non-glaring position, and means connected with said supporting reflector to be moved therewith for causing movement of said movable beam of light from its non-glaring position into a position with its upper rays substantially parallel with the roadway.

4. In an illuminating device, in combination, a front reflector, a source of light carried by said reflector to be moved therewith and extended transversely with relation thereto, a casing attached to the rear end of said front reflector, a movable reflector pivotally mounted in said casing and co-operating with said light source, an electromagnet located outside of said casing and operatively connected with said front reflector to be supported thereby and with the movable reflector within the said casing to effect movement of said movable reflector in one direction, and means for moving said movable reflector in the opposite direction.

5. In an illuminating device, in combination, a light source, a reflector in front of said light source having its front face in a plane abnormal to the horizontal axis of said reflector, to enable the beam of light projected by it to be positioned into a non-glaring position when the front face of the reflector is arranged in a plane substantially normal to a horizontal plane through the said illuminating device, a reflector in rear of said light source, and automatically operating means for moving the beam of light projected by said rear reflector into a non-glaring position to reenforce the non-glaring beam projected by said front reflector, and means for moving the second mentioned beam into glaring position at the will of the operator.

6. In an illuminating device, a casing provided with a lighting unit arranged to effect illumination without glare of the roadway in proximity to the illuminating device, and having a second lighting unit constructed and arranged in said casing to effect illumination of the roadway with a permanent nonglaring beam of light in proximity to the illuminating device and with a distant lighting beam whose upper rays are substantially parallel with the roadway, means within the casing for moving the distant lighting beam downward to reenforce said permanent non-glaring beam, and separate means within the casing for moving the distant lighting beam from its reenforcing position into its distant lighting position.

7. In an illuminating device, the combination with a casing, of a lighting unit insertable into and removable from said casing and comprising a light source, a reflector in front of said light source, a reflector in rear of said light source, an electromagnet to move one of said reflectors in one direction, means for moving said movable reflector in the opposite direction, and means for connecting together the parts of said unit to enable it to be inserted into and removed from said casing.

8. In an illuminating device, a light source, a reflector in front of the light source, a reflector in rear of said light source and connected with said front reflector to form a unit capable of being inserted into and withdrawn from a casing as one piece, one of said reflectors being fixed with its axis inclined downward and the other of said reflectors being movable in a vertical plane from a position in which it projects a downward inclined beam into a position in which it projects a beam substantially parallel with the roadway, an electromagnet to move said movable reflector in one direction, and means for moving said movable reflector in the opposite direction.

9. In an illuminating device, a light source, a reflector in front of the light source and having its axis inclined downward and its mouth substantially vertical to project a downward inclined beam of light, and a reflector in rear of the light source with its axis substantially horizontal to project a distant beam of light substantially parallel with the roadway, said rear reflector being connected with the front reflector to form a unit capable of being inserted into and withdrawn from a casing as one piece.

In testimony whereof, I have signed my name to this specification.

CROMWELL A. B. HALVORSON, Jr.